Aug. 12, 1941.    W. PAULUS    2,252,351

METHOD OF PRODUCING POWER TRANSMITTING UNITS

Filed Nov. 9, 1938

INVENTOR
William Paulus,
BY
Beau, Brooks, Buckley & Beau.
ATTORNEYS

Patented Aug. 12, 1941

2,252,351

UNITED STATES PATENT OFFICE 2,252,351

METHOD OF PRODUCING POWER TRANSMITTING UNITS

William Paulus, Buffalo, N. Y., assignor to Trico Products Corporation, Buffalo, N. Y.

Application November 9, 1938, Serial No. 239,643

3 Claims. (Cl. 29—149.5)

This invention relates to a method of forming or producing a ball and socket joint.

The advantage of the ball and socket connection between the driving and driven parts of a mechanism is well known in the mechanical world. It has heretofore been proposed to shape one of the elements of the joint about the companion element. However, in the practice of the known methods difficulties were encountered in the production of large quantities of the joints.

The present invention has for its object to provide a novel method which is practically adapted for mass production of the joint in an expeditious manner. It further comprehends an improved method of producing a power transmitting unit, including the ball and socket coupling, especially adapted for small power plants, such as an automatic windshield cleaner for motor vehicles.

As showing one embodiment of the present invention, reference is made to the accompanying drawing wherein—

Figure 1:
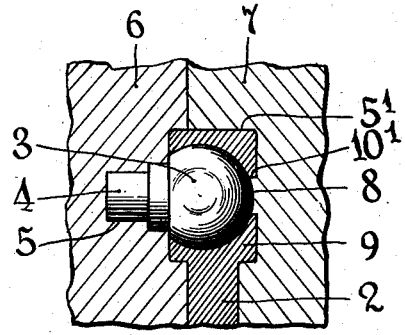
Fig. 1 is a fragmentary sectional view of the joint in the mold.
Figure 3:
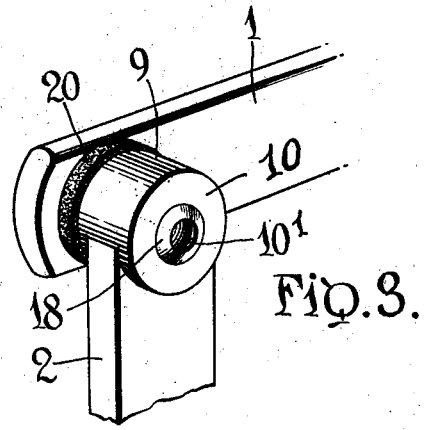
Fig. 3 is a fragmentary perspective view of a power transmitting unit embodying the joint.

Referring more particularly to the drawing, the ball and socket joint of the present invention, which obviously may be produced per se without reference to any particular field of use, has been illustrated herein as connecting the push-pull link 1 and the arm 2 of a power transmitting unit of any appropriate design according to the mechanism in which it is designed to be used. The ball part 3 of the joint is preferably formed of a relatively hard metal such as steel and is anchored by its shank 4 within the cavity or recess 5 of one of the separable parts 6 and 7 of a mold, the supplemental recess 5' having a positioning stud 8 axially related to and cooperating with the shank 4 to support the ball in position during the die casting operation. Prior to the die casting operation the ball may be coated with graphite, if desired, to lessen the tendency for adhesion between the parts. The socket part 9 of the joint is cast, along with the arm 2 about the anchored ball by expressing the molten metal into the composite mold cavity in accordance with any approved die casting operation. This socket is preferably of a relatively softer metal, such as zinc alloy, and because of the presence of the stud 8, its bottom wall 10 will be formed with an opening 10' which reduces the metal in the portion of the socket opposite the shank 4 for weakening the same. The socket wall at such point may be cast thin without an opening, if desired, for localizing a comparatively weak area or zone. The side walls of the socket member are formed heavier for better accommodating the lateral thrusts from the ball when embodied in a power transmitting unit.

Following the casting of the socket part about the relatively harder ball part the joint is removed from the mold and placed in the recess 11 of an anvil 12. The bottom wall of the recess is centrally dished, as at 13, immediately underlying the opening 10' and its adjacent defining portion of the bottom wall 10. The reason for this depression 13 is to permit such adjacent or bottom portion of the socket member yielding thereinto during the adhesion-breaking step in the process now to be described.

Figure 2:
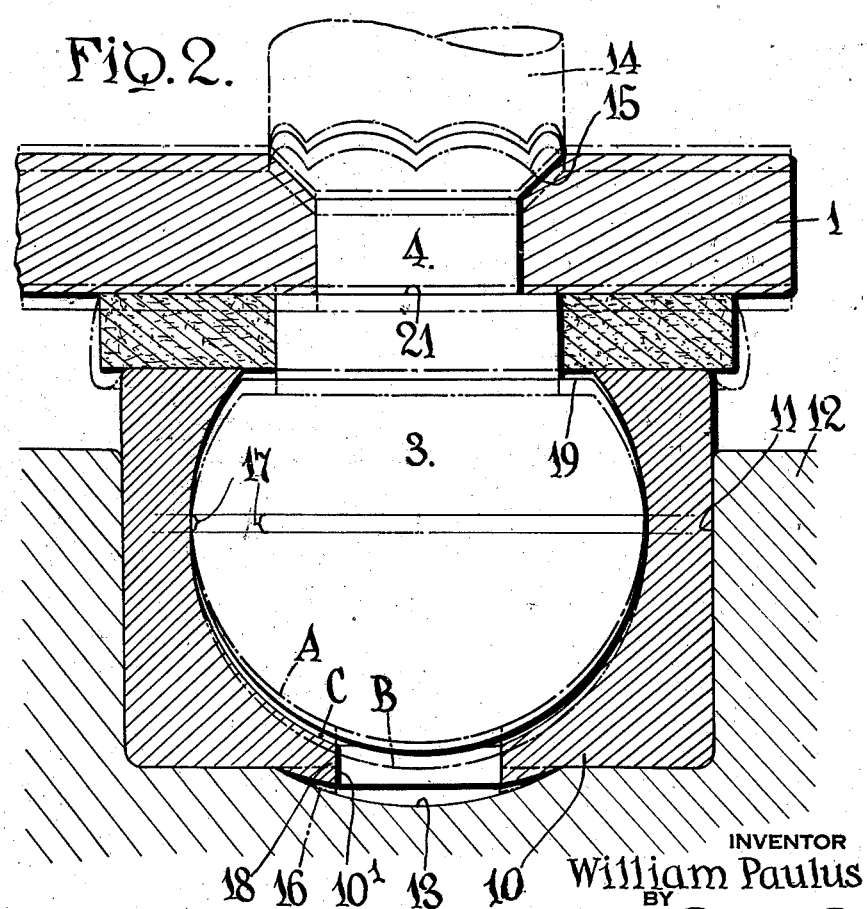
Fig. 2 is a similar view of the joint but on an exaggerated scale, depicting the adhesion-breaking step of the process.

With the socket part of the joint positioned on the anvil and the link 1 located over the shank 4, the latter is struck a blow, as through a swaging tool 14. The force of the impact is designed to jar the ball loose from the socket walls, for freely swiveling therein, and to concurrently spread the outer end of the shank over the link 1, as indicated at 15, to unite rigidly the parts of the power transmitting unit. While these two operations may be performed separately, the final product is expeditiously completed by the single step just related. This adhesion-breaking step has been clearly depicted by the exaggerated showing of Fig. 2, wherein the dot and dash line A indicates the initial position of the lower part of the socket wall with respect to the upper part thereof (disregarding possible slight variation due to shrinkage pressure of the cast socket member on the ball); wherein the double dot and dash line B indicates the extreme limit of travel of the ball under the impact as determined by the weakened bottom portion of the socket member bottoming in the depression 13, as illustrated at 16; and wherein the solid line C indicates the finished elongated shape of the socket which it assumes upon the rebound of the distended portion from the depression 13. The result of this elongation of the socket produces an equatorial portion which is cylindrical to a certain extent, as indicated at 17, and the weakened bottom portion is displaced about the opening 10', as shown at 18. By reason of this socket elongation the metal in the socket is obviously crowded under the pressure of the ball against the anvil except where the depression 13 receives the displaced metal. The cylindrical portion 17 has a diameter equal to or slightly greater than the outside diameter of the ball so that the latter may move lengthwise of the axis of the shank and rotatively thereabout as well as angularly within the socket. This diameter of the cylindrical portion 17 is practically that originally given the socket and in order to give lateral support to this medial portion (which constitutes the side walls of the socket) during the step of forming such cylindrical section, the side walls of the recess 11 in the anvil 12 may be sufficiently deep to receive such medial portion, as shown in Fig. 2. It will be observed that a definite clearance is provided between the hemispherical portions of the ball and the socket walls at opposite sides of the cylindrical portion 17 whereby the ball may have free universal as well as bodily movements within the socket but that lateral thrust will be accommodated without play or lost motion.

In connection with the die casting operation, as the socket cools off it will shrink about the ball and consequently when the ball is given a sharp blow, the upper portion of the socket adjacent the protruding shank will microscopically follow the ball due to its initial shrinkage stresses onto the ball. The continued movement of the ball will obviously withdraw the ball from the upper portion of the socket and thereby break any adhesion between the parts in this locality. Upon release of the pressure from the impact, the ball springs back a trifle but the impact is so controlled that the return push of the ball does not carry the latter into pressure contact with such upper portion of the socket. Consequently in its final condition the ball will have a very slight free end movement which has been exaggerated in Fig. 2 for ease of description. This back and forth movement of the ball loosens it in its side contact with the die cast metal for free universal action.

The ball is flattened about the shank to provide a shoulder 19 for supporting a lubricant holding felt ring 20 as a means for lubricating the formed joint. The shank 4 is reduced outwardly beyond this shoulder to form a second shoulder 21 for supporting the power link 1 during the swaging step and serves, together with the spread portion 15, in confining the pivotal movement of the link on the shank.

From the foregoing it will be apparent that a novel universal joint has been developed and a simple method devised for its economical manufacture as a part of a power transmitting unit, or by itself, in which the preformed part is freed of its cast companion part in an effective manner, and while the description has been given in detail it is not the intention thereby to restrict the scope of the invention defined by the appended claims.

What is claimed is:

1. The method of forming a ball and socket universal joint wherein the ball part has a shank, comprising casting about the ball part a socket part including side and end walls, forming the lower end wall with an inner weakened portion substantially in axial alinement with said shank, supporting the socket part in a manner to rigidly support said lower end wall about its outer marginal face to leave said end wall about the weakened portion unsupported, applying pressure to the upper end of the ball in a direction substantially alined with the axis of said shank to cause the unsupported weakened end wall portion to distend to create clearance between said ball and the end walls of said socket.

2. The method of forming a ball and socket universal joint wherein the ball part has a shank, comprising casting about the ball part a socket part including side and end walls, forming the lower end wall with an opening substantially in axial alinement with said shank, supporting the socket part in a manner to confine the side walls against expansion and confining said end wall about its outer marginal face to leave said end wall portion about the opening unsupported, applying pressure to said shank to cause the unsupported end wall portion about the opening to distend to create clearance between said ball and the end walls of said socket.

3. The method of making a power transmitting unit including a ball and socket joint and a power transmitting element wherein the ball part has a shank, comprising casting about the ball part a socket part including side and end walls, forming the lower end wall with a centrally located weakened portion substantially in axial alinement with said shank, supporting the socket part in a manner to confine the side walls against expansion and confining said end wall about its outer marginal face to leave the weakened end wall portion unsupported, passing said shank through an aperture in said power transmitting element with the latter spaced from said socket part, and applying pressure to the shank to concurrently secure said shank to said power transmitting element and cause the unsupported weakened end wall portion to distend to create clearance between said ball and the end walls of said socket.

WILLIAM PAULUS.